Patented Nov. 19, 1935

2,021,267

UNITED STATES PATENT OFFICE 2,021,267

INDIGOID VAT DYESTUFFS

Norbert Steiger, Frankfort-on-the-Main, and Eduard Albrecht, Frankfort-on-the-Main-Fechenheim, Germany, assignors to General Aniline Works, Inc., New York, N. Y., a corporation of Delaware No Drawing. Application February 4, 1935, Serial No. 4,987. In Germany February 10, 1934

4 Claims. (Cl. 260—49)

Our present invention relates to new indigoid vat dyestuffs, more particularly to those corresponding to the general formula:

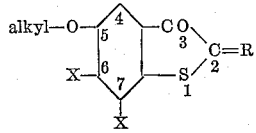

wherein one of the X's means methyl and the other halogen and R means the radicle of a component capable of forming indigoid dyestuffs.

These new dyestuffs are distinguished by valuable covered shades and in comparison with the analogous symmetrical dyestuffs by a good affinity for the vegetable fibers. In some cases their tinctorial properties may be further enhanced by after-halogenation.

The alkoxy - chlormethyl - hydroxy-thionaphthenes being the starting materials of our new dyestuffs may be obtained by converting the corresponding alkoxy-chloromethyl-benzene-sulfonic acids into the sulfochlorides, mercaptans, thioglycolic acids and ring-closing the latter or also by introducing a sulfur-containing radical into the ortho position to the amino group of a corresponding alkoxy-chlormethyl-amino-benzene according to one of the known methods.

These hydroxy-thionaphthenes are, themselves or after the transformation into their reactive 2-derivatives, condensed with isatins or hydroxy-thionaphthenes of the benzene or naphthalene series or respectively with the reactive 2-derivatives thereof.

In order to further illustrate our invention the following examples are given; but we wish it, however, to be understood that our invention is not limited to the particular products or reaction conditions stated therein.

Example 1

12 parts of 5-methoxy-6-methyl-7-chloro-3-hydroxy-thionaphthene (which melts at 185 to 186° C. when recrystallized from glacial acetic acid) are condensed in the presence of glacial acetic acid with 17 parts of 4-methyl-6-chloro-2,3-diketodihydrothionaphthene-2-(p-dimethyl-amino-anil). When cool the formed dyestuff is isolated. It corresponds to the formula:

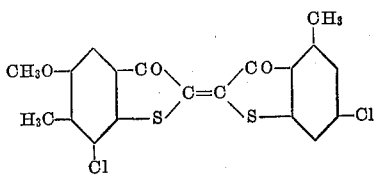

dissolves in concentrated sulfuric acid with a green color and dyes cotton from a yellow vat currant like shades of a good fastness.

The same dyestuff is obtained by decomposing inversely the p-dimethyl-aminoanil of the 5-methoxy-6-methyl-7-chloro-2,3-diketo-dihydrothionaphthene with the 4-methyl-6-chloro-hydroxythionaphthene.

When using as the second component the 2,3-naphthoxythiophene a dyestuff dyeing covered navy blue shades is obtained.

The aforesaid 5-methoxy-6-methyl-7-chloro-3-hydroxythionaphthene may be prepared as follows: 1-methyl-2-methoxy-6-chlorobenzene is converted by means of chlorosulfonic acid into the 5-sulfochloride, which is reduced by means of zinc dust into the corresponding mercapto compound. By condensing the latter with monochloroacetic acid the 2-chloro-3-methyl-4-methoxybenzene-1-thioglycolic acid of about 112° C. melting point is obtained which yields by condensing the acid chloride with aluminium chloride the 5-methoxy-6-methyl-7-chloro-3-hydroxythionaphthene.

When condensing the 5-methoxy-6-methyl-7-chlorohydroxythionaphthene with the anil of 6,7-dimethyl-5-methoxy-oxythionaphthene a dyestuff of fast gray shades in dyeing and printing is obtained.

Example 2

When condensing the isatin chloride which has been prepared by acting with 2.5 parts of phosphorus pentachloride on 2 parts of 2,1-naphthisatin with 2.3 parts of 5-methoxy-6-methyl-7-chloro-hydroxythionaphthene in the presence of chlorobenzene the formed dyestuff of the formula:

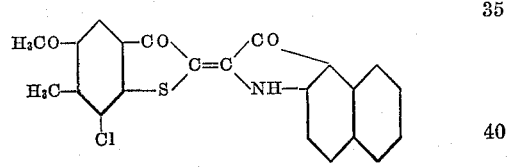

dissolves in concentrated sulfuric acid with a brown color and dyes cotton from a yellowish brown vat fast dark green shades.

Example 3

11.5 parts of 5-methoxy-6-chloro-7-methyl-3-hydroxy-thionaphthene are mixed with 17 parts of 2,1 - naphthoxythionaphthene-p-dimethylaminoanil and about 200 parts of glacial acetic acid and the mixture is heated at about 120° C. for about 2 hours while stirring. The separated dyestuff is isolated. It corresponds to the formula:

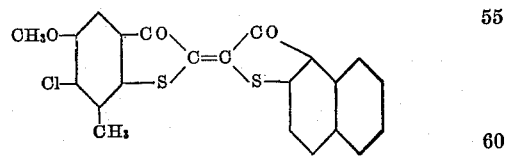

It dissolves in concentrated sulfuric acid with a violet color and dyes cotton from an orange vat brown shades of a good fastness particularly to light.

When using as second component the 8-chloro-1,2 - naphthoxythiophene - p - dimethylaminoanil the formed dyestuff dyes cotton fast gray shades.

When condensing the p-dimethylaminoanil of 5 - methoxy-6-chloro - 7 - methoxythionaphthene with 5-methoxy-6,7-dichloroxythionaphthene a fast gray dyeing dyestuff is obtained.

The aforesaid 5-methoxy-6-chloro-7-methyl-3-hydroxythionaphthene is obtainable by replacing in the 2-amino-3-methoxy-1-methylbenzene-6-sulfonic acid the amino group by chlorine according to Sandmeyer's reaction, conversion into the corresponding sulfochloride, reduction to the mercapto compound, condensation with monochloroacetic acid and ring closure of the formed 2-methyl-3-chloro-4-methoxy - benzene-1-thioglycolic acid of about 129° C. melting point.

We claim:

1. Indigoid vat dyestuffs corresponding to the general formula:

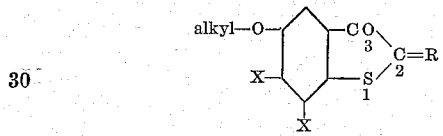

wherein one of the X's means methyl and the other halogen and R means the radicle of a component capable of forming indigoid dyestuffs.

2. The indigoid vat dyestuff of the formula:

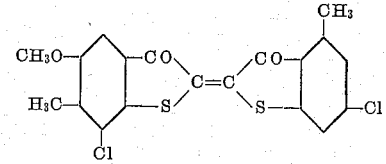

which dissolves in concentrated sulfuric acid with a green color and dyes cotton, from a yellow vat, currant like shades of a good fastness.

3. The indigoid vat dyestuff of the formula:

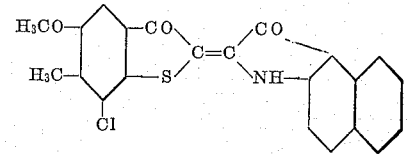

which dissolves in concentrated sulfuric acid with a brown color and dyes cotton, from a yellowish brown vat, fast dark green shades.

4. The indigoid vat dyestuff of the formula:

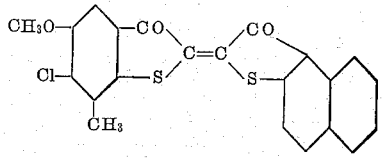

which dissolves in concentrated sulfuric acid with a violet color and dyes cotton, from an orange vat, brown shades of a good fastness particularly to light.

NORBERT STEIGER.
EDUARD ALBRECHT.